(12) United States Patent
Islam et al.

(10) Patent No.: US 10,595,356 B2
(45) Date of Patent: Mar. 17, 2020

(54) OPTIMIZED INITIAL VEHICLE MODEM CONNECTIVITY SEARCH

(71) Applicant: FORD GLOBAL TECHNOLOGIES, LLC, Dearborn, MI (US)

(72) Inventors: Muhammad Khaledul Islam, Ottawa (CA); Jeffrey William Wirtanen, Kanata (CA)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/996,616

(22) Filed: Jun. 4, 2018

(65) Prior Publication Data

US 2019/0373665 A1 Dec. 5, 2019

(51) Int. Cl.
| | |
|---|---|
| *H04W 76/19* | (2018.01) |
| *H04W 4/40* | (2018.01) |
| *H04B 17/318* | (2015.01) |
| *H04W 4/02* | (2018.01) |

(52) U.S. Cl.
CPC .......... *H04W 76/19* (2018.02); *H04B 17/318* (2015.01); *H04W 4/40* (2018.02); *H04W 4/027* (2013.01)

(58) Field of Classification Search
None
See application file for complete search history.

(56) References Cited

U.S. PATENT DOCUMENTS

| 6,343,070 | B1 | 1/2002 | Klas et al. | |
|---|---|---|---|---|
| 6,871,139 | B2 | 3/2005 | Liu et al. | |
| 8,000,842 | B2 | 8/2011 | Yi et al. | |
| 2007/0081506 | A1* | 4/2007 | Yamada | H04W 84/02 370/338 |
| 2016/0205238 | A1* | 7/2016 | Abramson | G01C 21/3484 455/456.4 |
| 2017/0001649 | A1* | 1/2017 | Dickow | H04W 12/08 370/328 |
| 2019/0014604 | A1* | 1/2019 | Gerlach | H04W 8/005 370/328 |

FOREIGN PATENT DOCUMENTS

GB 2536718 A 9/2016

\* cited by examiner

*Primary Examiner* — Anh Vu H Ly
(74) *Attorney, Agent, or Firm* — Michael J. Spenner; Brooks Kushman P.C.

(57) ABSTRACT

A system includes a memory storing last-used frequency settings and protocol settings, and a processor of a telematics controller of a vehicle. The processor is programmed to, responsive to the vehicle being powered from a parked state, set a period during which the vehicle attempts to reconnect per the last-used frequency settings and protocol settings without performing a full scan via a modem; and perform a full scan via the modem responsive to expiration of the period.

16 Claims, 3 Drawing Sheets

OPTIMIZED INITIAL VEHICLE MODEM CONNECTIVITY SEARCH

TECHNICAL FIELD

Aspects of the disclosure generally relate to optimization of initial wireless connectivity searching performed upon initiation of a vehicle route.

BACKGROUND

Use of vehicle connectivity features has continued to increase. These features may include navigation, roadside assistance, and in-vehicle Wi-Fi as some examples. The vehicle may include a modem configured to connect to a network to support these connectivity features. To maintain the connection, the modem scans various frequencies and protocols that are supported by the modem in order to identify a usable connection.

SUMMARY

In one or more illustrative examples, a system includes a memory storing last-used frequency and protocol settings and trip end data, and a processor of a telematics controller of a vehicle. The processor is programmed to, responsive to the vehicle being powered from a parked state, set a period during which the vehicle attempts to reconnect to the latest settings without performing a full scan via a modem; and perform a full scan via the modem responsive to expiration of the period.

In one or more illustrative examples, a method includes responsive to identifying a parking maneuver, store trip end data indicating movements of the vehicle and last-used frequency and protocol settings indicating current settings of a modem connection to a network; responsive to the vehicle being powered from a parked state, setting a period during which the vehicle attempts to reconnect to the network per the current settings without performing a full scan; and performing a full scan responsive to expiration of the period.

In one or more illustrative examples, a non-transitory computer-readable medium comprising instructions that, when executed by a processor of a telematics controller of a vehicle, cause the controller to store last-used frequency and protocol settings and trip end data; and responsive to the vehicle being powered from a parked state, set a period during which the vehicle attempts to reconnect to the latest settings without performing a full scan via the modem; and perform a full scan via a modem responsive to expiration of the period.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A vehicle may be parked overnight in a location lacking cellular coverage (e.g., in an underground parking garage). When the vehicle is turned on, it is likely that the vehicle is about to leave the parking garage and return back to the same cellular coverage as the previous day. A cellular modem of a telematics controller (TCU) of the vehicle may perform a full scan of all frequencies and technologies for service, but ultimately will likely return back to the same frequency and technology as the previous day once the vehicle leaves the garage. Accordingly, performing full scans of all frequencies and technologies when resuming wireless connectivity is both power intensive and wasteful of time.

An improved reconnection procedure may account for the high probability that the vehicle will be leaving a location such as an underground parking garage and following the same path as the previous day. Movement and location (e.g., dead reckoning, GPS, etc.) may also be factored into the algorithm. The scanning algorithm can aggressively scan for the previously utilized frequencies and technology for an initial period of time. This will enable the TCU of the vehicle to quickly return to the previous cellular coverage without performing a full scan. In doing so, the vehicle may quickly regain coverage avoiding scanning of low probability frequencies technology combinations. This both improves user experience (e.g., obtaining traffic info or maps and directions more quickly) and also reduces power consumption of the TCU.

Figure 1:
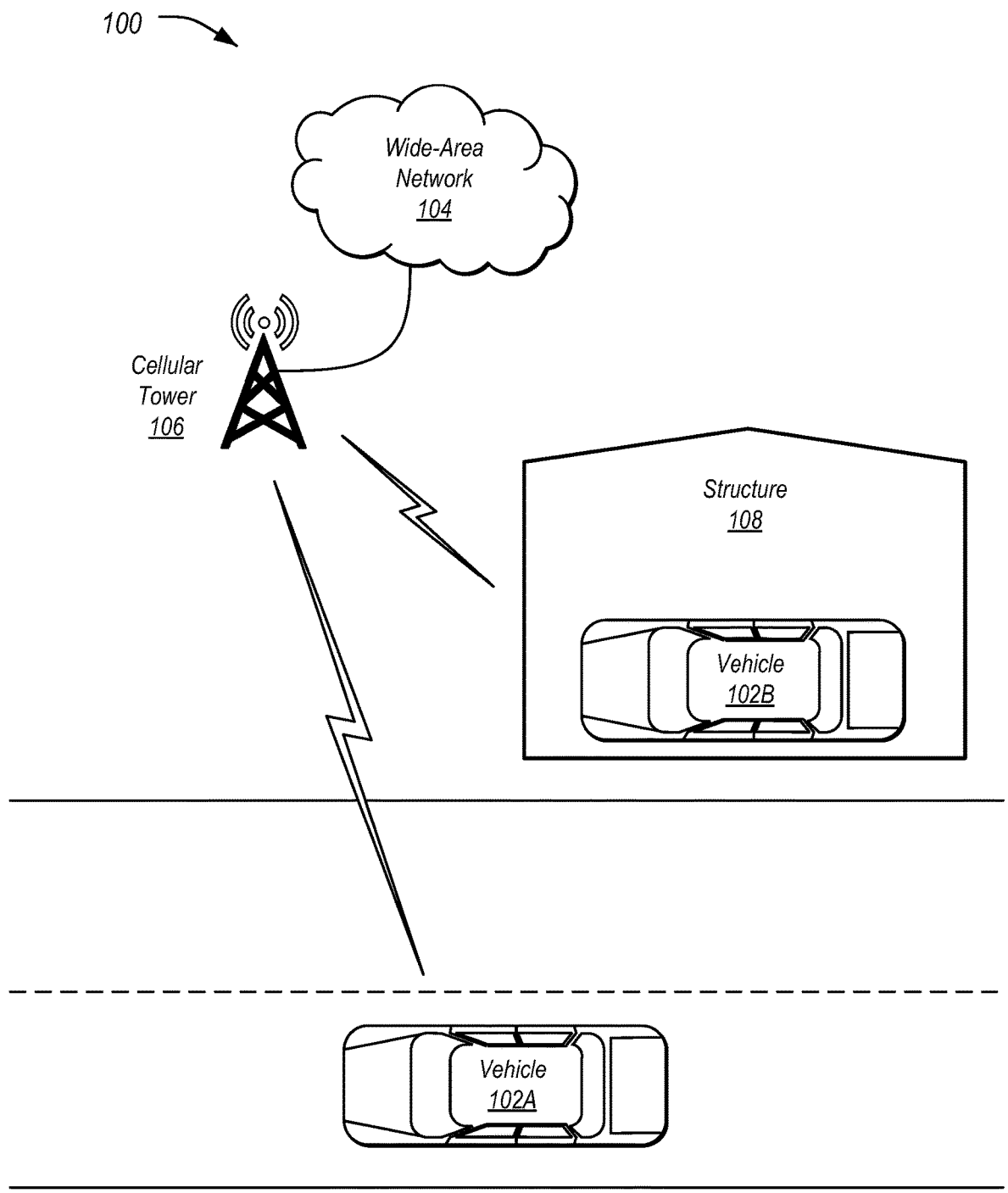
FIG. 1 illustrates an example system for connection of a vehicle to a wide-area network.

FIG. 1 illustrates an example system 100 for connection of a vehicle 102 to a wide-area network 104. As shown, the system 100 includes vehicles 102A and 102B (collectively 102) in communication over a wide-area network 104. The vehicle 102 is configured to wirelessly communicate with cellular towers 106 connected to the wide-area network 104. Only one cellular tower 106 is shown for clarity, but it should be noted that systems 100 typically include many cellular towers 106 arranged to cover a large geographical area. While an example system 100 is shown in FIG. 1, the example components as illustrated are not intended to be limiting. Indeed, the system 100 may have more or fewer components, and additional or alternative components and/or implementations may be used. As an example, the system 100 may include more or fewer vehicles 102.

The vehicles 102 may include various types of automobile, crossover utility vehicle (CUV), sport utility vehicle (SUV), truck, recreational vehicle (RV), boat, plane or other mobile machine for transporting people or goods. In many cases, the vehicle 102 may be powered by an internal combustion engine. As another possibility, the vehicle 102 may be a hybrid electric vehicle (HEV) powered by both an internal combustion engine and one or more electric motors, such as a series hybrid electric vehicle (SHEV), a parallel hybrid electrical vehicle (PHEV), or a parallel/series hybrid electric vehicle (PSHEV). As the type and configuration of vehicle 102 may vary, the capabilities of the vehicle 102 may correspondingly vary. As some other possibilities, vehicles 102 may have different capabilities with respect to passenger capacity, towing ability and capacity, and storage volume. Further aspects of the functionality of the vehicle 102 are discussed in detail with respect to FIG. 2.

The wide-area network 104 may include one or more interconnected communication networks such as the Internet, a cable television distribution network, a satellite link network, a local area network, and a telephone network, as some non-limiting examples. By accessing the wide-area network 104, the vehicle 102 may be able to send outgoing data from the vehicle 102 to network destinations on the wide-area network 104, and receive incoming data to the vehicle 102 from network destinations on the wide-area network 104.

The cellular towers 106 may include system hardware configured to allow cellular transceivers of the vehicles 102 to access the communications services of the wide-area network 104. In an example, the cellular towers 106 may be part of a Global System for Mobile communication (GSM) cellular service provider. In another example, the cellular towers 106 may be part of a code division multiple access (CDMA) cellular service provider. The cellular towers 106 may support various different technologies and data speeds.

Signal strength of wireless signals from the cellular tower 106 to the vehicles 102 may decrease as distance between the cellular tower 106 to the vehicles 102 increases. Additionally, obstructions between the cellular tower 106 and the vehicle 102 may further reduce signal strength. For example, signal strength between the cellular tower 106 and a vehicle 102A traversing a roadway may be greater than signal strength between the cellular tower 106 and a vehicle 102B located within a structure 108 such as a garage. This may be due to attenuation of the signal by the structure 108, despite the vehicle 102B being physically closer to the cellular tower 106 than the vehicle 102A is.

Figure 2:
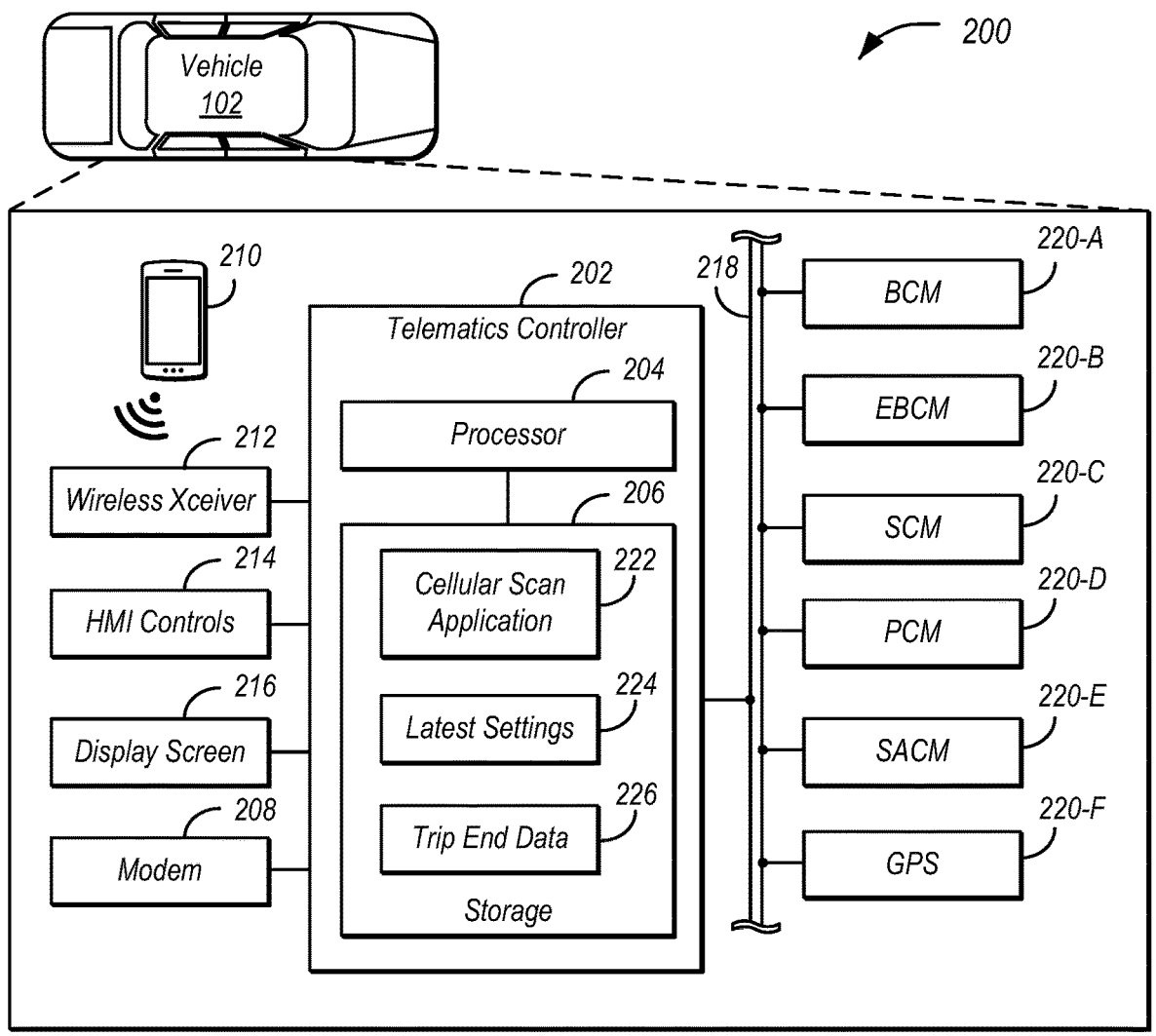
FIG. 2 illustrates an example diagram of the vehicle implementing communications features for quickly regaining coverage while avoiding scanning of low-probability frequency/technology combinations.

FIG. 2 illustrates an example diagram 200 of the vehicle 102 implementing communications features for quickly regaining coverage while avoiding scanning of low-probability frequency/technology combinations. The vehicle 102 includes a telematics controller 202 configured to communicate over the wide-area network 104. This communication may be performed using a modem 208 of the telematics controller 202. While an example vehicle 102 is shown in FIG. 2, the example components as illustrated are not intended to be limiting. Indeed, the vehicle 102 may have more or fewer components, and additional or alternative components and/or implementations may be used.

The telematics controller 202 may be configured to support voice command and BLUETOOTH interfaces with the driver and driver carry-on devices (e.g., mobile devices 210), receive user input via various buttons or other controls, and provide vehicle status information to a driver or other vehicle 102 occupants. An example telematics controller 202 may be the SYNC system provided by FORD MOTOR COMPANY of Dearborn, Mich.

The telematics controller 202 may further include various types of computing apparatus in support of performance of the functions of the telematics controller 202 described herein. In an example, the telematics controller 202 may include one or more processors 204 configured to execute computer instructions, and a storage 206 medium on which the computer-executable instructions and/or data may be maintained. A computer-readable storage medium (also referred to as a processor-readable medium or storage 206) includes any non-transitory (e.g., tangible) medium that participates in providing data (e.g., instructions) that may be read by a computer (e.g., by the processor(s) 204). In general, a processor 204 receives instructions and/or data, e.g., from the storage 206, etc., to a memory and executes the instructions using the data, thereby performing one or more processes, including one or more of the processes described herein. Computer-executable instructions may be compiled or interpreted from computer programs created using a variety of programming languages and/or technologies, including, without limitation, and either alone or in combination, JAVA, C, C++, C #, FORTRAN, PASCAL, VISUAL BASIC, PYTHON, JAVA SCRIPT, PERL, PL/SQL, etc.

The telematics controller 202 may be configured to communicate with mobile devices 210 of the vehicle occupants. The mobile devices 210 may be any of various types of portable computing device, such as cellular phones, tablet computers, smart watches, laptop computers, portable music players, or other devices capable of communication with the telematics controller 202. As with the telematics controller 202, the mobile device 210 may include one or more processors configured to execute computer instructions, and a storage medium on which the computer-executable instructions and/or data may be maintained. In many examples, the telematics controller 202 may include a wireless transceiver 212 (e.g., a BLUETOOTH controller, a ZIGBEE transceiver, a Wi-Fi transceiver, etc.) configured to communicate with a compatible wireless transceiver of the mobile device 210. Additionally, or alternately, the telematics controller 202 may communicate with the mobile device 210 over a wired connection, such as via a USB connection between the mobile device 210 and a USB subsystem of the telematics controller 202.

The telematics controller 202 may also receive input from human-machine interface (HMI) controls 214 configured to provide for occupant interaction with the vehicle 102. For instance, the telematics controller 202 may interface with one or more buttons or other HMI controls 214 configured to invoke functions on the telematics controller 202 (e.g., steering wheel audio buttons, a push-to-talk button, instrument panel controls, etc.). The telematics controller 202 may also drive or otherwise communicate with one or more displays 216 configured to provide visual output to vehicle occupants, e.g., by way of a video controller. In some cases, the display 216 may be a touch screen further configured to receive user touch input via the video controller, while in other cases the display 216 may be a display only, without touch input capabilities. In an example, the display 216 may be a head unit display included in a center console area of the vehicle 102 cabin. In another example, the display 216 may be a screen of a gauge cluster of the vehicle 102.

The telematics controller 202 may be further configured to communicate with other components of the vehicle 102 via one or more in-vehicle networks 218. The in-vehicle networks 218 may include one or more of a vehicle controller area network (CAN), an Ethernet network, or a media oriented system transfer (MOST), as some examples. The in-vehicle networks 218 may allow the telematics controller 202 to communicate with other vehicle 102 systems, such as a body controller (BCM) 220-A, an electronic brake control system (EBCM) 220-B, a steering control system (SCM) 220-C, a powertrain control system (PCM) 220-D, a safety control system (SACM) 220-E, and a global positioning system (GPS) 220-F. As depicted, the controllers 220 are represented as discrete controllers and systems. However, the controllers 220 may share physical hardware, firmware, and/or software, such that the functionality from multiple controllers 220 may be integrated into a single controller 220, and that the functionality of various such controllers 220 may be distributed across a plurality of controllers 220.

The BCM 220-A may be configured to support various functions of the vehicle 102 related to control of current loads feeding off the vehicle 102 battery. Examples of such current loads include, but are not limited to, exterior lighting, interior lighting, heated seats, heated windshield, heated backlight, and heated mirrors. Additionally, the BCM 220-A may be configured to manage vehicle 102 access functions, such as keyless entry, remote start, and point of access status verification (e.g., closure status of the hood, doors and/or trunk of the vehicle 102).

The EBCM 220-B may be configured to control braking functions of the vehicle 102. In some examples, the EBCM 220-B may be configured to receive signal information from vehicle wheel sensors and/or drivetrain differentials, and manage anti-lock and anti-skid brake functions through control of brake line valves that adjust brake pressure from the master cylinder.

The SCM 220-C may be configured to aid in vehicle steering by augmenting or counter-acting steering effort provided to the vehicle 102 wheels. In some cases, the augmented steering effort may be provided by a hydraulic steering assist configured to provide controlled energy to the steering mechanism, while in other cases the augmented steering effort may be provided by an electric actuator system.

The PCM 220-D may be configured to perform engine control and transmission control functions for the vehicle 102. With respect to engine control, the PCM 220-D may be configured to receive throttle input and control actuators of the vehicle engine to set air/fuel mixture, ignition timing, idle speed, valve timing, and other engine parameters to ensure optimal engine performance and power generation. With respect to transmission control, the PCM 220-D may be configured to receive inputs from vehicle sensors such as wheel speed sensors, vehicle speed sensors, throttle position, transmission fluid temperature, and determine how and when to change gears in the vehicle 102 to ensure adequate performance, fuel economy, and shift quality. The PCM 220-D may further provide information over the in-vehicle networks 218, such as vehicle speed and engine RPM.

The SACM 220-E may be configured to provide various functions to improve the stability and control of the vehicle 102. As some examples, the SACM 220-E may be configured to monitor vehicle sensors (e.g., steering wheel angle sensors, yaw rate sensors, lateral acceleration sensors, wheel speed sensors, etc.), and control the BCM 220-A, SCM 220-C, and/or PCM 220-D. As some possibilities, the SACM 220-E may be configured to provide throttle input adjustments, steering angle adjustments, brake modulation, and all-wheel-drive power split decision-making over the in-vehicle network 218 to improve vehicle stability and controllability. It should be noted that in some cases, the commands provided by the SACM 220-E may override other command input. The GPS 220-F is configured to provide vehicle 102 current location and heading information for use in vehicle 102 services.

A cellular scan application 222 may be an application installed to the memory of the telematics controller 202. When executed by the processor 204, the cellular scan application 222 may cause the telematics controller 202 to direct the modem 208 to perform full scans of all frequencies and technologies receivable by the modem 208 for cellular service provided by cellular towers 106.

The cellular scan application 222 may be further configured to cause the telematics controller 202 to maintain latest settings 224 to the storage 206 of the telematics controller 202. The prior settings 224 may be indicative of the cellular technology (e.g., LTE, CDMA, 3G, 4G, 5G, etc.) with which the modem 208 is connected to the cellular tower 106, as well as the frequency or frequencies on which the modem 208 is connected (e.g., 700 MHz, 800 MHz, 1700 MHz, 1900 MHz, 2500 MHz, etc.).

Rather than perform a full scan of all frequencies and technologies, for an initial period when vehicle 102 connectivity is requested, the cellular scan application 222 may be further configured to direct the modem 208 to reconnect to the latest settings 224. The initial period may include, for example, an initial period of time (e.g., 10 seconds, 30 seconds, one minute, five minutes) and/or an initial distance (e.g., 5 meters, 10 meters, 100 meters, etc.). The initial period may be set from vehicle 102 restart from park, for example.

In some examples, trip end data 226 may further be utilized to determine the initial period. The trip end data 226 may include navigation information indicative of a vehicle 102 path to a parked location. For instance, the cellular scan application 222 may begin tracking location and movement of the vehicle 102 responsive to identifying an abrupt reduction in signal strength from the modem 208 (e.g., indicative of the vehicle 102 entering an underground parking garage). As the vehicle 102 may be expected to follow the same path out of the garage or other location, the movements of the trip end data 226 up until the reduction in signal strength may be used as the period during which the vehicle 102 directs the modem 208 to reconnect to the latest settings 224 without performing full cellular scans.

Figure 3:
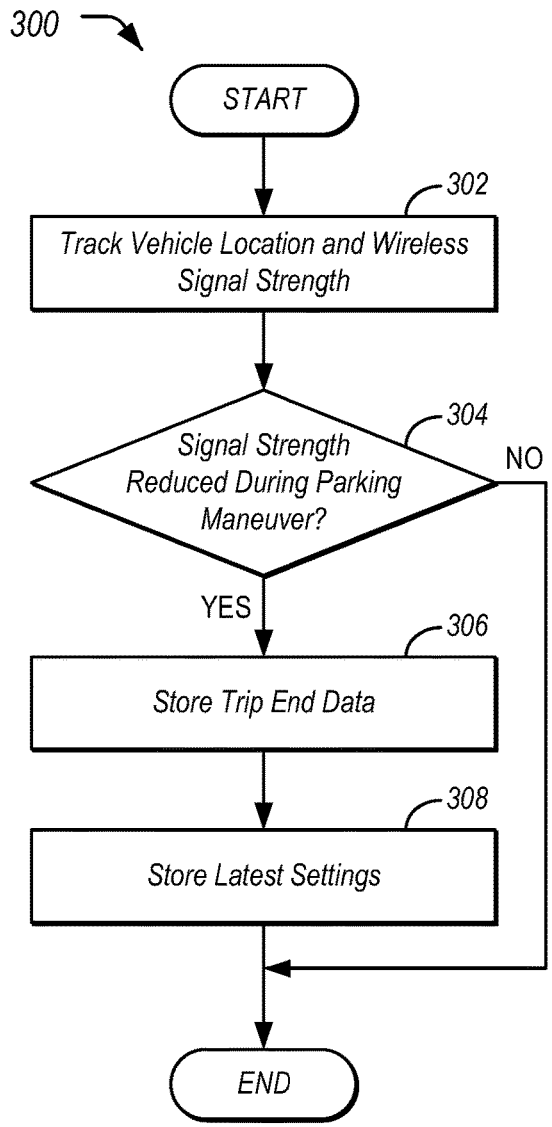
FIG. 3 illustrates an example process for storing trip end data by a vehicle.

FIG. 3 illustrates an example process 300 for storing trip end data by a vehicle 102. In an example, the process 300 may be performed by the cellular scan application 222 of the telematics controller 202 of the vehicle 102 discussed in detail above.

At operation 302, the telematics controller 202 tracks vehicle 102 location and wireless signal strength. In an example, the telematics controller 202 may receive current vehicle 102 location information over the in-vehicle networks 218 from the GPS 220-F. In another example, the telematics controller 202 may receive information over the in-vehicle networks 218 based on vehicle 102 speed and direction that may be used to perform dead reckoning. The telematics controller 202 may also monitor the signal strength according to data received from the modem 208.

At 304, the telematics controller 202 determines whether the signal strength has been reduced during a parking maneuver. In an example, the telematics controller 202 may identify that the vehicle 102 is driving at a slow rate of speed indicative of parking (e.g., less than 10 kilometers per hour) in combination with an abrupt attenuation of signal strength indicative of entering a structure 108. If such an event occurs, control passes to operation 306.

The telematics controller 202 stores trip end data 226 at 306. In an example, the telematics controller 202 records navigation information indicative of a vehicle 102 path to a parked location. In another example, the telematics controller 202 may record a time to the parked location from the triggering event or a distance traveled to the parked location from the triggering event.

At 308, the telematics controller 202 stores latest settings 224. In an example, the latest settings 224 that are stored may be indicative of the cellular technology with which the modem 208 is connected to the cellular tower 106, as well as the frequency or frequencies on which the modem 208 is connected. These last-used frequencies may include, for example, more than one last used frequency. For instance, in LTE carrier aggregation there could be two frequencies—a primary and a secondary. Both of these frequencies may then be high priority candidates for scanning. In some cases, the protocol settings may also include neighbor frequencies. This is because, when a modem 208 is camped on a cell of the wide-area network 104, the cell may indicate the additional neighbor cell frequencies in the area. These too may be high priority candidates. After operation 308, the process 300 ends.

Figure 4:
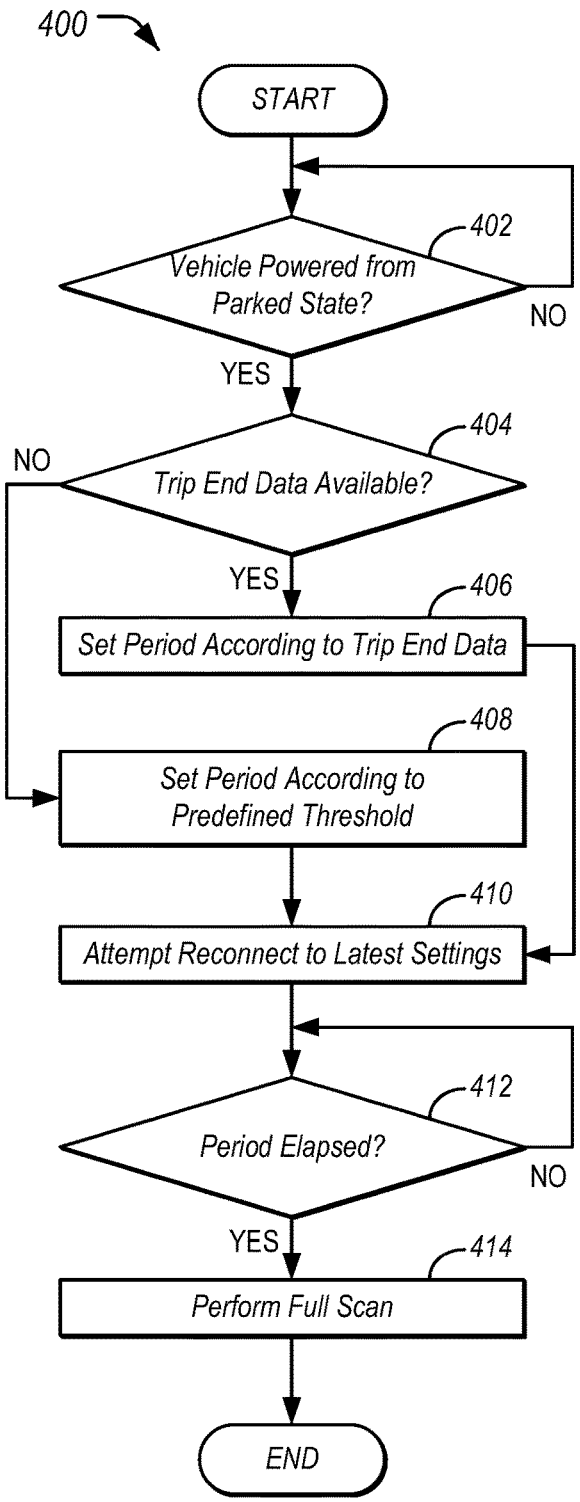
FIG. 4 illustrates an example process for quickly regaining coverage while avoiding scanning of low-probability frequency/technology combinations.

FIG. 4 illustrates an example process 400 for quickly regaining coverage while avoiding scanning of low-probability frequency/technology combinations. As with the process 300, the process 400 may be performed by the cellular scan application 222 of the telematics controller 202 of the vehicle 102 discussed in detail above.

At operation 402, the telematics controller 202 determines whether the vehicle 102 was powered on from a parked state. In an example, the vehicle 102 may be powered on by a user pressing a push to start button or turning a key in the vehicle 102 ignition.

The telematics controller 202 determines whether trip end data 226 is available at 404. The trip end data 226 may have been stored according to the process 300, discussed in detail above. In an example, the telematics controller 202 may access the storage 206 to identify whether trip end data 226 is stored. If so, control passes to operation 406. Otherwise, control passes to operation 408.

At 406, the telematics controller 202 sets a period before performing a full scan according to the trip end data 226. In an example, the telematics controller 202 sets the period to an amount of time indicated by the trip end data 226 as being expended from an abrupt attenuation of signal strength indicative of entering a structure 108 and the parking of the vehicle 102. In another example, the telematics controller 202 additionally or alternately sets the period to a distance time indicated by the trip end data 226 as being traveled from the attenuation. In yet a further example, the telematics controller 202 may utilize dead reckoning based on vehicle 102 speed and direction recorded in the trip end data 226 to determine the period until the vehicle 102 is likely to have exited the area of attenuated signal.

At 408, the telematics controller 202 sets the period according to a predefined threshold. In an example, if no trip end data 226 is available, the telematics controller 202 may set the period to a predefined time period and/or to a predefined speed of travel and/or a predefined distance traveled.

At operation 410, the telematics controller 202 attempts to reconnect to the wide-area network 104 using the latest settings 224 recorded by the telematics controller 202. In an example, the telematics controller 202 may attempt to reconnect to the wide-area network 104 according to high priority candidate identified according to the latest settings 224 saved in operation 308 of the process 300, e.g., to the frequency and technology noted in the latest settings 224. This may include, for example, attempting to connect to a frequency (or frequencies) that were previously connected to. This may also include, as another example, attempts to connect to additional neighbor cell frequencies in the area of the vehicle 102.

At 412, the telematics controller 202 determined whether the period before performing a full scan has elapsed. If not, control remains at operation 412. If so, control passes to operation 414 to perform a full scan of all frequencies and technologies for service available to the modem 208. After operation 414, the process 400 ends.

Computing devices described herein, such as the telematics controller 202, generally include computer-executable instructions where the instructions may be executable by one or more computing devices such as those listed above. Computer-executable instructions, such as those of the cellular scan application 222, may be compiled or interpreted from computer programs created using a variety of programming languages and/or technologies, including, without limitation, and either alone or in combination, JAVA™, C, C++, C #, VISUAL BASIC, JAVASCRIPT, PYTHON, JAVASCRIPT, PERL, PL/SQL, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
a memory storing last-used frequency settings, protocol settings, and trip end data; and
a processor of a telematics controller of a vehicle, programmed to
responsive to the vehicle being powered from a parked state, set a period during which the vehicle attempts to reconnect per the last-used frequency settings and protocol settings without performing a full scan via a modem; and
perform a full scan via the modem responsive to expiration of the period,
wherein the trip end data indicates the period as one or more of (i) an amount of time expended from an abrupt attenuation of signal strength indicative of entering a structure until parking of the vehicle, or (ii) a distance traveled from the abrupt attenuation of signal strength indicative of entering the structure until the parking of the vehicle.

2. The system of claim 1, wherein the last-used frequency settings include a primary frequency and a secondary frequency, and the protocol settings include neighbor frequencies.

3. A system comprising:
a memory storing last-used frequency settings, protocol settings, and trip end data; and
a processor of a telematics controller of a vehicle, programmed to
responsive to the vehicle being powered from a parked state, set a period during which the vehicle attempts to reconnect per the last-used frequency settings and protocol settings without performing a full scan via a modem;
perform a full scan via the modem responsive to expiration of the period; and
to utilize dead reckoning based on vehicle speed and direction recorded in the trip end data to determine the period until the vehicle is likely to have exited the area of attenuated signal.

4. The system of claim 1, wherein the full scan includes the processor directing the modem to scan all frequencies and technologies for service available to the modem.

5. A system comprising:
a memory storing last-used frequency settings and protocol settings; and
a processor of a telematics controller of a vehicle, programmed to
responsive to the vehicle being powered from a parked state, set a period during which the vehicle attempts to reconnect per the last-used frequency settings and protocol settings without performing a full scan via a modem;
perform a full scan via the modem responsive to expiration of the period;
track local and wireless signal strength for the vehicle; and
responsive to the signal strength being reduced due to a parking maneuver, store trip end data in the memory based on movements of the vehicle and store the last-used frequency settings and protocol settings based on current settings of a connection of the modem to a wide-area network.

6. A system comprising:
a memory storing last-used frequency settings and protocol settings; and
a processor of a telematics controller of a vehicle, programmed to
responsive to the vehicle being powered from a parked state, set a period during which the vehicle attempts to reconnect per the last-used frequency settings and protocol settings without performing a full scan via a modem;
perform a full scan via the modem responsive to expiration of the period; and
identify a parking maneuver performed by the vehicle responsive to a rate of speed indicative of parking in combination with an attenuation of signal strength indicative of entering a structure.

7. A method comprising:
responsive to identifying a parking maneuver, storing trip end data indicating movements of a vehicle and last-used frequency and protocol settings indicating current settings of a connection of a modem of the vehicle to a network;
responsive to powering the vehicle from a parked state, setting a period during which the vehicle attempts to reconnect to the network per the current settings without a full scan; and
performing a full scan responsive to expiration of the period.

8. The method of claim 7, wherein the trip end data indicates the period as an amount of time expended from an abrupt attenuation of signal strength indicative of entering a structure until parking of the vehicle.

9. The method of claim 7, wherein the trip end data indicates the period as a distance traveled from an abrupt attenuation of signal strength indicative of entering a structure until parking of the vehicle.

10. The method of claim 7, further comprising utilizing dead reckoning based on vehicle speed and direction recorded in the trip end data to determine the period until the vehicle is likely to have exited the area of attenuated signal.

11. The method of claim 7, wherein the full scan includes directing the modem to scan all frequencies and technologies for service available to the modem.

12. The method of claim 7, further comprising identifying the parking maneuver responsive to a rate of speed indicative of parking in combination with an attenuation of signal strength indicative of entering a structure.

13. A non-transitory computer-readable medium comprising instructions that, when executed by a processor of a telematics controller of a vehicle, cause the controller to:
store last-used frequency, protocol settings, and trip end data; and
responsive to the vehicle being powered from a parked state, set a period during which the vehicle attempts to reconnect to the latest settings without performing a full scan via a modem; and
perform a full scan via a modem responsive to expiration of the period,
wherein the trip end data indicates the period as one or more of ii) an amount of time expended from an abrupt attenuation of signal strength indicative of entering a structure until parking of the vehicle, or (ii) a distance traveled from the abrupt attenuation of signal strength indicative of entering the structure until the parking of the vehicle.

14. A non-transitory computer-readable medium comprising instructions that, when executed by a processor of a telematics controller of a vehicle, cause the telematics controller to:
- store last-used frequency, protocol settings, and trip end data;
- responsive to the vehicle being powered from a parked state, set a period during which the vehicle attempts to reconnect to the latest settings without performing a full scan via a modem; and
- perform a full scan via a modem responsive to expiration of the period,
- utilize dead reckoning based on vehicle speed and direction recorded in the trip end data to determine the period until the vehicle is likely to have exited the area of attenuated signal.

15. The medium of claim 13, wherein the full scan includes the processor directing the modem to scan all frequencies and technologies for service available to the modem.

16. A non-transitory computer-readable medium comprising instructions that, when executed by a processor of a telematics controller of a vehicle, cause the telematics controller to:
- store last-used frequency, protocol settings, and trip end data;
- responsive to the vehicle being powered from a parked state, set a period during which the vehicle attempts to reconnect to the latest settings without performing a full scan via a modem;
- perform a full scan via a modem responsive to expiration of the period;
- track local and wireless signal strength for the vehicle; and
- responsive to the signal strength being reduced due to a parking maneuver, store the trip end data based on movements of the vehicle and store the last-used frequency and protocol settings based on current settings of a connection of the modem to a wide-area network, the parking maneuver being identified responsive to a rate of speed indicative of parking in combination with an attenuation of signal strength indicative of entering a structure.

* * * * *